United States Patent
Datta et al.

(10) Patent No.: US 8,473,945 B2
(45) Date of Patent: Jun. 25, 2013

(54) ENABLING SYSTEM MANAGEMENT MODE IN A SECURE SYSTEM

(75) Inventors: Sham M. Datta, Hillsboro, OR (US); Mohan J. Kumar, Aloha, OR (US); Maheeh Natu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1353 days.

(21) Appl. No.: 11/967,779

(22) Filed: Dec. 31, 2007

(65) Prior Publication Data

US 2009/0172385 A1  Jul. 2, 2009

(51) Int. Cl.
*G06F 9/455* (2006.01)
(52) U.S. Cl.
USPC .................................................. 718/1
(58) Field of Classification Search
None
See application file for complete search history.

(56) References Cited

U.S. PATENT DOCUMENTS

| | | | |
|---|---|---|---|
| 7,165,135 B1 * | 1/2007 | Christie et al. | 710/269 |
| 7,209,994 B1 * | 4/2007 | Klaiber et al. | 710/264 |
| 7,694,298 B2 * | 4/2010 | Goud et al. | 718/1 |
| 2003/0229794 A1 * | 12/2003 | Sutton et al. | 713/189 |
| 2004/0034816 A1 * | 2/2004 | Richard | 714/39 |
| 2005/0076186 A1 * | 4/2005 | Traut | 712/1 |
| 2005/0114578 A1 * | 5/2005 | Lewis | 710/260 |
| 2005/0251867 A1 * | 11/2005 | Sastry et al. | 726/34 |
| 2005/0262571 A1 * | 11/2005 | Zimmer et al. | 726/27 |
| 2006/0015869 A1 * | 1/2006 | Neiger et al. | 718/1 |
| 2006/0224878 A1 * | 10/2006 | Datta et al. | 713/2 |
| 2007/0016766 A1 * | 1/2007 | Richmond et al. | 713/100 |

* cited by examiner

*Primary Examiner* — Emerson Puente
*Assistant Examiner* — Hiren Patel
(74) *Attorney, Agent, or Firm* — Trop, Pruner & Hu, P.C.

(57) ABSTRACT

Apparatuses, methods, and systems for enabling system management mode in a secure system are disclosed. In one embodiment, a processor includes sub-operating-system mode logic, virtual machine logic, and control logic. The sub-operating-system mode logic is to support a sub-operating-system mode. The virtual machine logic is to support virtualization. The control logic is to prevent virtualization from being enabled when the sub-operating-system mode is disabled.

14 Claims, 2 Drawing Sheets

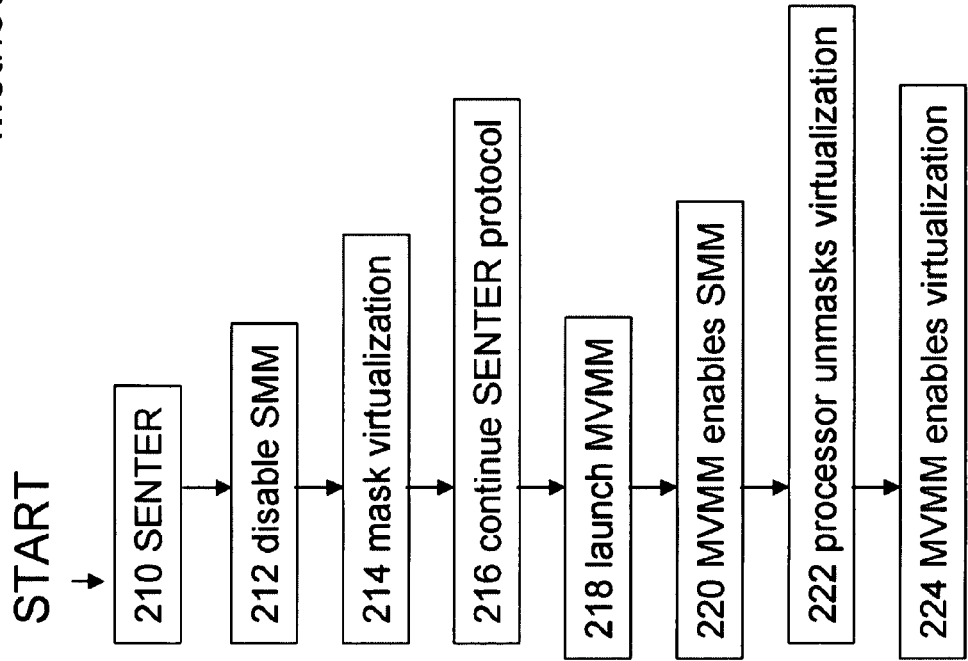

ENABLING SYSTEM MANAGEMENT MODE IN A SECURE SYSTEM

BACKGROUND

1. Field

The present disclosure pertains to the field of information processing; more specifically, to secure information processing systems.

2. Description of Related Art

Information processing systems, such as those including a processor in the Intel® Pentium® Processor Family from Intel Corporation, may support operation in a secure system environment. A secure system environment may include a trusted partition and an un-trusted partition. The bare platform hardware of the system and trusted software may be included in the trusted partition. Direct access from the un-trusted partition to the resources of the trusted partition may be prevented to protect any secrets that the system may contain from being discovered or altered.

The bare platform hardware of the system may be included in the trusted partition through the execution of a secure system entry protocol. For example, an initiating processor may execute a secure enter ("SENTER") instruction, to which all agents in the system must respond appropriately in order for the protocol to succeed. The responding agents may be required to not issue any instructions or process any transactions during the secure entry process, so that the initiating processor may validate a firmware module as authentic and trusted, execute the firmware module to configure the system to support trusted operations, and initiate the execution of a measured virtual machine monitor ("MVMM"). The MVMM may create one or more virtual machine environments in which to run un-trusted software, such that un-trusted software does not have direct access to system resources.

Typically, the secure system entry protocol is invoked by a basic input/output system ("BIOS") or boot loader installed in the system by the system manufacturer. Therefore, the system manufacturer typically controls the secure system entry protocol. In contrast, the MVMM is usually written by an operating system ("OS"), virtual machine monitor ("VMM"), or hypervisor vendor, and the system manufacturer typically does not control the MVMM.

Furthermore, the system may provide a sub-OS mode, such as system management mode ("SMM"), which is an operating environment that is parallel to the normal execution environment and may be used to perform special tasks such as system management, device management, power management, thermal management, reliability functions, availability functions, serviceability functions, etc. SMM is typically entered by asserting a system management interrupt ("SMI") pin and exited by executing a resume instruction. Since SMM is a separate operating environment, it has its own private memory space that must be protected from the normal execution environment. Although this private memory space is separate from regular system memory, it is mapped to an address region in regular system memory.

Typically, SMM is disabled as part of the execution of the SENTER instruction, so that malicious code cannot use an SMI to disrupt the secure system entry protocol. Therefore, the system manufacturer generally depends on the OS vendor to enable SMM in the MVMM.

BRIEF DESCRIPTION OF THE FIGURES

The present invention is illustrated by way of example and not limitation in the accompanying figures.

FIG. 2 illustrates an embodiment of the invention in a method for enabling system management mode in a secure system.

DETAILED DESCRIPTION

Figure 1:
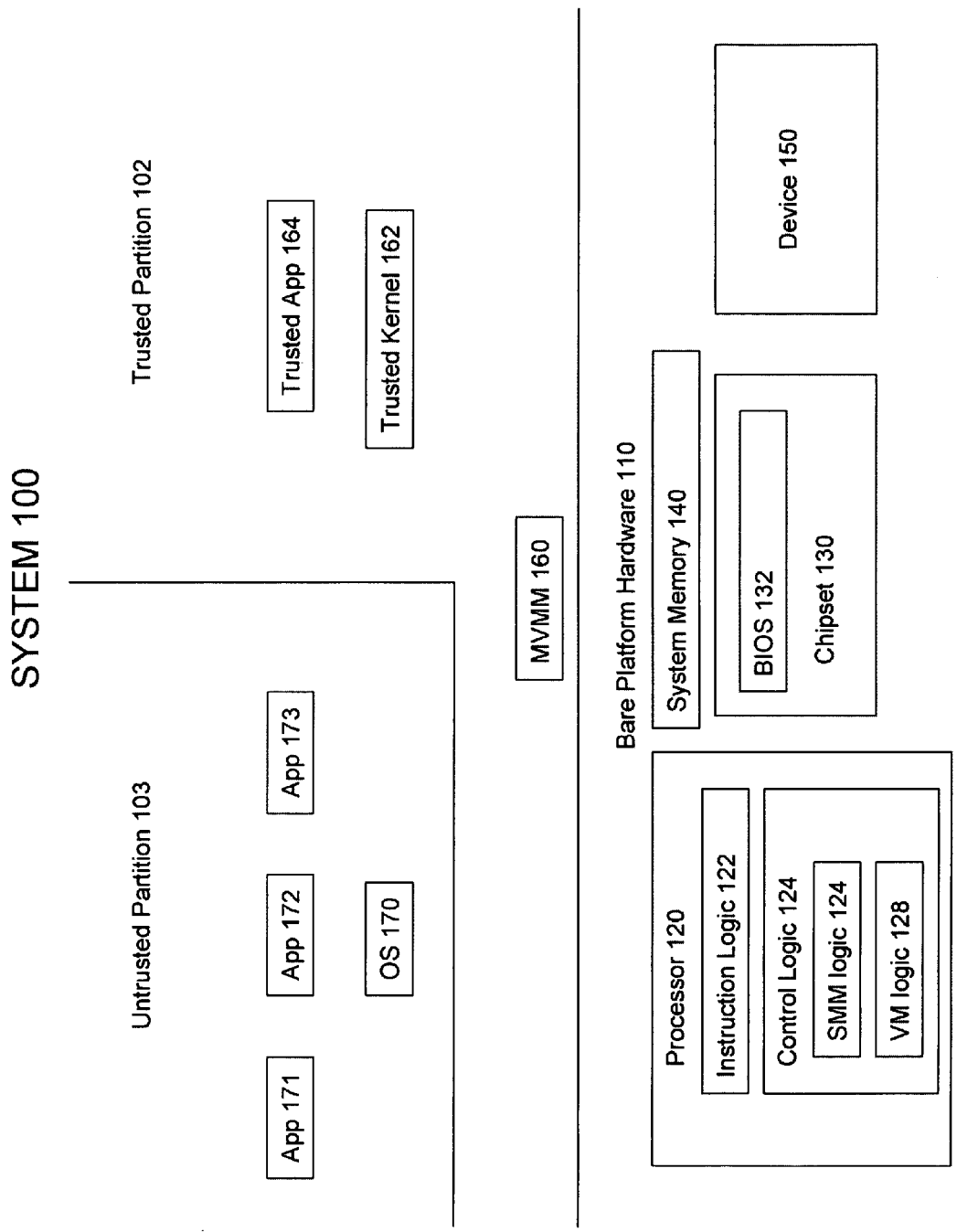
FIG. 1 illustrates an embodiment of the invention in an information processing system.

Embodiments of the present invention in systems, apparatuses, and methods for enabling system management mode in a secure system are described. In the description, specific details such as processor and system configurations may set forth in order to provide a more thorough understanding of the present invention. It will be appreciated, however, by one skilled in the art that the invention may be practiced without such specific details. Additionally, some well known structures, circuits, and the like have not been shown in detail, to avoid unnecessarily obscuring the present invention.

Embodiments of the present invention provide for enabling SMM in a secure system, in a manner that is more likely to be controlled by the system manufacturer than the OS vendor. This approach may be desired because generally, the system manufacturer rather than the OS vendor controls all of the other aspects of SMM.

FIG. 1 illustrates an embodiment of the present invention in secure information processing system 100. Information processing system 100 may be personal computer, a mainframe computer, a portable computer, a handheld device, a set-top box, a server, or any other computing system. In this embodiment, system 100 includes bare platform hardware 110, which in turn includes one or more processor packages 120, chipset(s) 130, system memory 140, and device 150.

Processor 120 may be any component having one or more execution cores, where each execution core may be based on any of a variety of different types of processors, including a general purpose microprocessor, such as a processor in the Intel® Pentium® Processor Family, Itanium® Processor Family, or other processor family from Intel® Corporation, or another processor from another company, or a special purpose processor or microcontroller, or may be a reconfigurable core (e.g. a field programmable gate array). Although FIG. 1 shows only one such processor 120, system 100 may include any number of processors, including any number of execution cores and threads, in any combination.

System memory 140 may be any medium on which information, such as data and/or program code, may be stored, such as static or dynamic random access memory, semiconductor-based read-only or flash memory, magnetic or optical disk memory, or any other type of medium readable by processor 120, or any combination of such mediums.

Chipset 130 may be any group of circuits and logic that supports memory operations, input/output operations, configuration, control, internal or external interface, connection, or communications functions (e.g., "glue" logic and bus bridges), and/or any similar functions for processor 120 and/or system 100. Individual elements of chipset 130 may be grouped together on a single chip, a pair of chips, dispersed among multiple chips, and/or be integrated partially, totally, redundantly, or according to a distributed approach into one or more processors, including processor 120.

Chipset 130 may include BIOS 132, stored on any medium readable by processor 120, such as any of those listed above in the description of system memory 140 (although BIOS 132 may or may not be stored on the same medium as the medium of system memory 140).

Device 150 may represent any number of any type of I/O, peripheral, or other devices, such as a keyboard, mouse, trackball, pointing device, monitor, printer, media card, network interface, information storage device, etc. Device 150 may be embodied in a discrete component, or may be included in an integrated component with any other devices. In one embodiment, device 150 may represent a single function in a multifunctional I/O, peripheral, or other device.

Processor 120, chipset 130, system memory 140, SMM memory 141, and device 150 may be coupled to or communicate with each other according to any known approach, such as directly or indirectly through one or more parallel, sequential, pipelined, asynchronous, synchronous, wired, wireless, or other bus or point-to-point connection. System 100 may also include any number of additional devices, agents, components, or connections.

System 100 is configured for secure operations according to any known approach. System 100 is divided into trusted partition 102 and un-trusted partition 103. Trusted partition 102 includes bare platform hardware 110, MVMM 160, trusted kernel 162, and trusted application 164. MVMM 160 may be any virtual machine monitor, hypervisor, or other such software program that is a trusted entity invoked during a secure entry process to control one or more virtual machines to execute other software programs, some of which are trusted and some of which are not be trusted. Un-trusted partition 103 includes operating system 170, and applications 171, 172, and 173. Each partition may also include additional processors, cores, portions of memory, devices, or any other physical resources described above or otherwise known in the art of information processing.

Processor 120 includes instruction logic 122 and control logic 124. Instruction logic 122 is to receive instructions to which processor 120 is designed to respond, as described below. Instruction logic 122 may include any circuitry, logic, or other structure that recognizes, decodes, or otherwise receives instructions.

Control logic 124 is to cause processor to respond to instructions received by instruction logic 122. Control logic 124 may include any circuitry, logic, or other structures, such as microcode, state machine logic, programmable logic, or any other form of control logic, to cause processor 120 to respond appropriately to instructions. To do so, control logic 124 may refer to any form of hardware, software, or firmware, such as a processor abstraction layer, within processor 120 or within any device accessible or medium readable by processor 120, such as system memory 140.

Control logic may include SMM logic 126 and virtual machine ("VM") logic 128. SMM; logic 126 may include any circuitry, logic, or other structures to support a sub-OS mode in processor 120. VM logic 128 may include any circuitry, logic, or other structures to support virtualization (e.g., the execution of VMs) in processor 120.

For the purpose of the present application, a sub-OS mode may be defined as an operating mode having the ability to operate in an OS transparent or quasi-transparent manner, or in a privilege-level independent manner, for the purpose of executing low-level patches, system management, power management, system reliability, system availability, and system serviceability, functions, or other similar functions. One such mode is the system management mode ("SMM") of the Intel® Pentium® processor family and compatible processors. (See Chapter 14 of the Pentium® 4 Processor Software Developer's Manual, Vol. III, 2001 edition, order number 245472, available from Intel Corporation of Santa Clara, Calif.) Other sub-OS modes may exist in a MIPS Technologies® MIPS32™ or MIPS64™ architecture processor, in an IBM® PowerPC™ architecture processor, in a SPARC International® SPARC® architecture processor, or in any number of other processors. Sub-OS modes may be invoked by a dedicated sub-operating system mode interrupt, sometimes generated by system firmware or system hardware. This dedicated sub-OS mode interrupt is usually designed to be non-maskable in order to respond to the exigencies that required the entry into the mode.

Control logic 124 may operate based on signals from instruction logic 122, and/or based on any parameters or other information associated with instructions, to cause processor 120 to execute portions of method embodiments of the present invention, such as method 200, as illustrated in FIG. 2. For example, control logic 124 may cause processor 120 to execute portions of method embodiments of the present invention by executing one or more micro-instructions or micro-operations in response to receiving an instruction.

FIG. 2 illustrates method 200 for enabling SMM in a secure system according to an embodiment of the present invention. Although method embodiments of the invention are not limited in this respect, reference may be made to elements of system 100 to describe the method embodiment of FIG. 2. Method 200 refers to instructions by names that may be used according to one embodiment; in other embodiments, these instructions or similar instructions may have different names.

In block 210, the entry of a system into a secure system environment is initiated, e.g., by BIOS 132 or a boot loader issuing a secure enter ("SENTER") instruction. In block 212, during and/or as part of the execution of the SENTER instruction, SMM is disabled, e.g., by control logic 124 setting an SMM mask bit in or referenced by SMM logic 126. Alternatively, SMM may be disabled by default.

In block 214, in response to the disabling SMM, virtualization is masked, e.g., by control logic 124 setting a VM mask bit in or referenced by VM logic 128. Masking of virtualization means that virtualization cannot be enabled, e.g., control logic 124 is configured such that VM logic 128 cannot be enabled when the VM mask bit is set. Therefore, method 200 ensures that virtualization cannot be enabled unless SMM logic 126 is enabled.

In block 216, the SENTER protocol continues, which may include validating a firmware module as authentic and trusted, and executing the firmware module to configure the system to support trusted operations. In block 218, the SENTER protocol continues, initiating the execution of the MVMM.

In block 220, the MVMM enables SMM, e.g., by using an instruction ("SMCTRL") that clears the SMM mask bit. In block 222, as part of the execution of the SMCTRL instruction, virtualization is unmasked, e.g., by control logic 124 clearing the VM mask bit. In block 224, the MVMM enables virtualization, e.g., by setting a VM enable bit. Note that block 224 depends on block 220, because until virtualization is unmasked, it cannot be enabled and the MVMM cannot create virtual machines.

Within the scope of the present invention, it may be possible for method 200 to be performed in a different order, with illustrated block performed simultaneously, with illustrated blocks omitted, with additional blocks added, or with a combination of reordered, combined, omitted, or additional blocks.

Processor 120, or any other processor or component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these mediums may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, apparatuses, methods, and systems for enabling SMM in a secure system have been disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
   instruction circuitry to receive a secure enter instruction and a sub-operating system mode control instruction,
   sub-operating-system mode logic to support a sub-operating-system mode;
   virtual machine logic to support virtualization; and
   control logic to prevent virtualization from being enabled when the sub-operating-system mode is disabled in response to the instruction circuitry receipt of the secure enter instruction, to enable the sub-operating-system mode support in response to the instruction circuitry receipt of the sub-operating-system-mode control instruction, and to unmask virtualization support by clearance of a virtualization mask bit, and wherein a measured virtual machine monitor (MVMM) is to enable the sub-operating-system mode and virtualization in response to an instruction to clear a sub-operating-system mode mask bit, the instruction to clear received after the secure enter instruction.

2. The processor of claim 1, wherein the control logic is to disable sub-operating-system mode support by setting the sub-operating-system mode mask bit.

3. The processor of claim 1, wherein the control logic is to mask virtualization support in response to disabling the sub-operating-system mode.

4. The processor of claim 3, wherein the control logic is to mask virtualization support by setting the virtualization mask bit.

5. The processor of claim 1, wherein the control logic is to enable sub-operating system mode support by clearing the sub-operating-system mode mask bit.

6. The processor of claim 1, wherein the control logic is to unmask virtualization support in response to enabling the sub-operating-system mode.

7. A method comprising:
   receiving a secure system enter instruction;
   disabling support in a processor for a sub-operating-system mode, including setting a sub-operating-system mode mask bit in response to receiving the secure system enter instruction;
   masking, in response to disabling support for the sub-operating-system mode, support in the processor for virtualization, including setting a virtualization mask bit; and
   thereafter enabling the sub-operating-system mode and virtualization in response to a sub-operating system mode control instruction, wherein a measured virtual machine monitor (MVMM) is to enable the sub-operating-system mode and virtualization in response to an instruction to clear the sub-operating-system mode mask bit and to clear the virtualization mask bit to unmask support for virtualization.

8. The method of claim 7, further comprising:
   receiving the sub-operating system mode control instruction.

9. The method of claim 8, wherein enabling support for the sub-operating system mode includes clearing the sub-operating-system mode mask bit.

10. The method of claim 8, further comprising unmasking support for virtualization in response to enabling support for the sub-operating-system mode.

11. The method of claim 10, wherein unmasking support for virtualization includes clearing the virtualization mask bit.

12. A system comprising:
   a storage to store a basic input output system to initiate a secure system enter protocol; and
   a processor including:
      instruction logic to receive an instruction to initiate the secure system enter protocol and a sub-operating system mode control instruction;
      sub-operating system mode logic to support a sub-operating-system mode;
      virtual machine logic to support virtualization; and
      control logic to disable sub-operating-system mode support in response to the instruction to initiate the secure system enter protocol, to enable the sub-operating-system mode support in response to the instruction logic receipt of the sub-operating-system-mode control instruction after initiation of the secure enter protocol, to unmask virtualization support by clearance of a virtualization mask bit, and to mask virtualization when the sub-operating-system mode is disabled.

13. The system of claim 12, further comprising a measured virtual machine monitor to create a virtual machine within a secure environment established by the secure system enter protocol, where the virtual machine is to execute un-trusted software.

14. The system of claim 13, wherein the virtual machine is to unmask virtualization by enabling sub-operating-system mode support.

* * * * *